United States Patent Office 3,700,639
Patented Oct. 24, 1972

3,700,639
CRYSTALLINE POLYSTYRENE PRODUCTS
George E. Hulse and James J. Harris, Pittsburgh, Pa., assignors to Sinclair-Koppers Company
Filed Dec. 22, 1971, Ser. No. 210,832
Int. Cl. C08f 15/40, 19/04, 27/26
U.S. Cl. 260—88.2 C    4 Claims

ABSTRACT OF THE DISCLOSURE

Highly crystalline, isotactic polystyrene products having molecular weight of less than 1,000,000 are prepared by the thermal degradation in air at temperatures between 100° C. and 260° C. of high molecular weight, highly crystalline copolymers of styrene with 2–20 percent by weight of an alpha-olefin having 3 to 10 carbon atoms. The initial copolymers have a molecular weight in excess of 1,000,000. The rate of degradation of the copolymers of this invention is greater than the rate of degradation of polystyrene at the same temperatures. The crystallinity of the resulting polystyrene product is generally higher than that of the initial copolymers.

BACKGROUND OF THE INVENTION

This invention relates to a process for the preparation of highly crystalline, isotactic polystyrene products having a molecular weight of less than 1,000,000 which comprises degrading by heating in air of highly crystalline copolymers of styrene having from 2 to 20 percent by weight of an alpha-olefin having from 3 to 10 carbon atoms.

Isotactic polystyrenes prepared by the Ziegler-Natta catalyst system are usually polymers of very high molecular weight (in the millions) and a high degree of crystallinity, and as such are difficult to process by usual molding techniques. To overcome the difficulties of processing, the obvious solution is to degrade the high molecular weight, crystalline polymers to polymers of lower molecular weight (less than 1,000,000). Thermal decomposition in the presence of bromine-containing compounds has been suggested to accomplish the desired degradation. Thermal degradation in the presence of antioxidants has also been proposed.

SUMMARY OF THE INVENTION

It has now been found that highly crystalline polystyrene products of molecular weight between 10,000 and 1,000,000 can be prepared by first preparing highly crystalline, high molecular weight copolymers of styrene containing 2 to 20 percent by weight of an alpha-olefin having from 3 to 10 carbon atoms, and then heating the copolymer in air at a temperature of between 100° C. and 260° C., whereby the copolymer is degraded to polystyrene products having the same or greater degree of crystallinity than the starting copolymers.

These alpha-olefins may be copolymerized with styrene to high molecular weight, crystalline copolymers with the aid of any of the Ziegler-Natta type catalyst systems that are useful for the preparation of isotactic polystyrene.

DETAILED DESCRIPTION OF THE INVENTION

The copolymers of the invention may be made by copolymerizing styrene with suitable alpha-olefins having from 3 to 10 carbon atoms. Suitable alpha-olefins are propylene, 1-butene, 1-pentene, 3-methyl-1-butene, 1-hexene, 1-octene, 1-decene, and the like.

The alpha-olefin comonomer should be present to the extent of between 2 and 20 percent by weight of total copolymer. Amounts less than 2 percent gives copolymers whose rate of degradation is not appreciably greater than that of polystyrene. As the amount of comonomers gets greater than 20 percent, the copolymers seem to approach a maximum rate of degradation and the increase in cost of the copolymer offsets any advantage in rate of degradation.

The method of copolymerization is not critical, but the preferred method is to utilize any of the known Ziegler-Natta type catalyst systems whereby highly crystalline, isotactic styrene-alpha-olefin copolymers of high molecular weight are obtained. Thus, a complex catalyst consisting of triisobutyl aluminum with titanium trichloride in heptane at 90° C. gives a polymer of styrene having a molecular weight of about 2,000,000 with a crystallinity of about 26 percent and is suitable for preparing the styrene-alpha-olefin copolymers of the present invention.

The method of heating the copolymers to effect the degradation may be any of several known methods. For example, molding samples of polystyrene containing 4.1 percent propylene in air for 10 minutes at 240° C. followed by annealing at 180° C. for 1 hour causes a drop in molecular weight from 3,000,000 to 470,000. Where the recovery of the sample in the same physical form that one starts with it unimportant, heating may be effected in an extrusion or milling process. Thus, the same styrene-propylene copolymers, after mastication in a Brabender Plasticorder at 200° C. in air had a molecular weight of 105,000 after 15 minutes and of only 72,000 after 30 minutes. A preferred method of heating the copolymers is to place the copolymers in an open dish in a recirculating air oven set at the desired temperature. Temperatures of between 100 and 260° C. may be used, but the preferred temperature range is from 140 to 200° C. Temperatures below 100° C. necessitate an excessively long degradation time, whereas at temperatures above 240° C. (the melting point of isotactic polystyrene), while degradation occurs, the polymeric mass fuses and presents handling difficulties.

Figure 1:
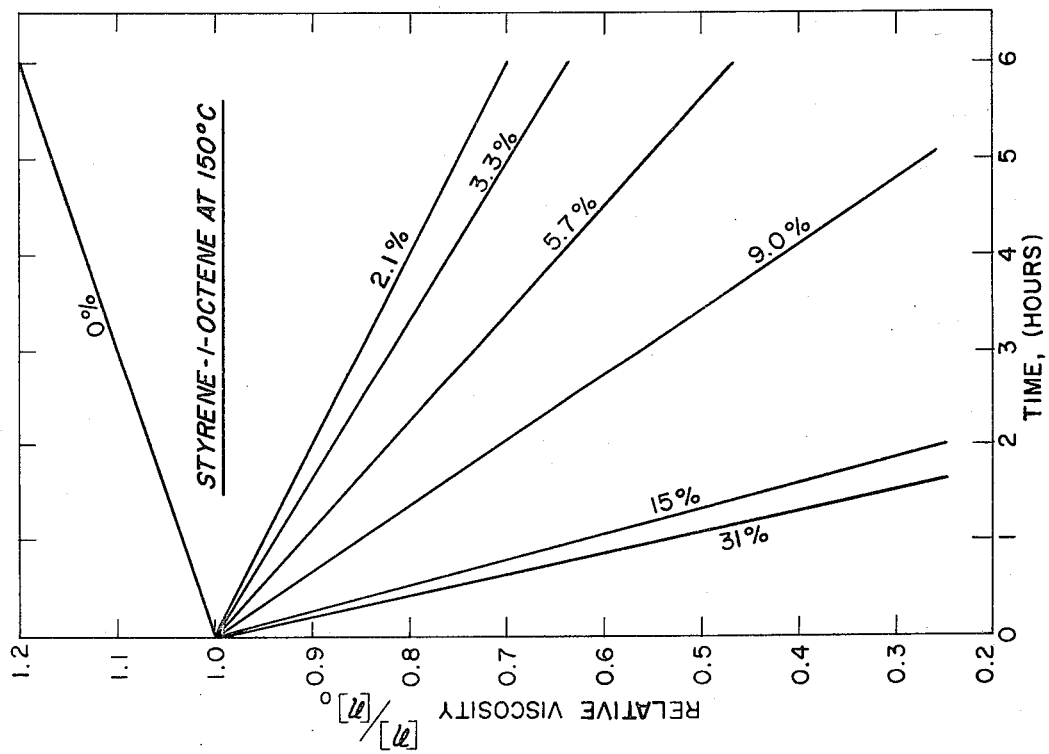
FIG. 1 is a graph showing the relative reduction in viscosity versus time of heating at 150° C. of copolymers of styrene containing varying amounts of 1-octene.

The time of heating may be varied from 1 to 24 hours, depending on the final molecular weight desired and the particular copolymer involved. The initial rate of degradation increases with increasing amounts of a particular comonomer in the copolymer as shown in the drawings at FIG. 1. The initial rate of degradation also depends on the particular alpha-olefin which is copolymerized with the styrene as shown by the drawings at FIG. 2, and the Table III. The rate of degradation also increases greatly with temperature of heating as indicated by the data in Tables II and III. The particular time and temperature required to produce a polystyrene of a desired molecular weight can be readily determined by a skilled technician from a knowledge of the composition and molecular weight of the initial copolymer and a few experiments of the type shown in Example II.

The degradation of the crystalline copolymers of the present invention does not cause any loss of crystallinity. In most cases, the crystallinity has been increased by the heating process. It is not known whether the increase in crystallinity is due solely to annealing effects or to the molecular weight breakdown giving smaller molecules which are beter able to crystallize. For example, a styrene-propylene copolymer having 5.0 percent propylene, initial molecular weight of 2,000,000 and an initial crystallinity of 26.25 percent was degraded by heating in air for 6 hours at 200° C. to form a polystyrene product of molecular weight of 24,000 and a final crystallinity of 39.5 percent. Similarly, a copolymer of styrene with 5.7 percent 1-octene having an initial molecular weight of 4,500,000 and a crystallinity of 18.3 percent was degraded for 24 hours at 150° C. to give a product of molecular weight 290,000 and a crystallinity of 34.1 percent. All crystallinities were measured by differential scanning calorimetry.

Molecular weights of the various polystyrene products were calculated from the intrinsic viscosity in chlorobenzene at 30° C. on the basis of the formula $$[\eta] = KM^a$$

where $[\eta]$ = intrinsic viscosity in 100 cc./g.
$K = 1.8 \times 10^{-4}$
$a = 0.72$
$M$ = viscosity average molecular weight.

The same formula was used to calculate the molecular weights of the styrene-alpha-olefin copolymers, although admittedly this is an approximation.

The following examples are given to illustrate the invention.

Example I

The general procedure used to prepare the copolymers of this invention was as follows:

A two-liter resin pot was equipped with a turbine stirrer, a thermometer, a dropping funnel, and a charging port containing a self-sealing rubber stopper through which catalyst could be added by means of a syringe. The apparatus was baked at about 150° for 18 hours while nitrogen was passed through the pot. After the apparatus was thus conditioned, it was cooled under nitrogen and the desired amounts of titanium trichloride catalyst were added through the charging port. Next, a measured amount of triisobutyl aluminum cocatalyst was added by syringe through the charging port. The heptane solvent was then added through the dropping funnel. The styrene and comonomer were then mixed and added to the dropping funnel. All manipulations were performed under a head of nitrogen. The stirrer was then started and allowed to stir at about 1,000 r.p.m. throughout the polymerization. When the resin pot had been heated to 90° C., the monomers were added dropwise from the funnel, while controlling the temperature of the reaction mixture at 90° C. ±2° C. After about 6 hours, the reaction mass was allowed to cool to about 60° C. and the catalyst was killed by the addition of 200 ml. of methanol followed by stirring and heating to reflux for one hour. The copolymers settled out to the bottom of the pot as white particles when the stirrer was stopped. The copolymers were recovered by filtration, washed with methanol and dried.

To illustrate the method, a series of copolymerizations were run using styrene and 1-octene mixtures of varying ratios. The amounts of catalyst, solvent, and monomers are given in Table I along with the percent yield of copolymers, the copolymer composition, the intrinsic viscosity of the copolymers, and the percent crystallinity of the copolymers.

TABLE I

Copolymerization of Styrene with 1-Octene

| Run No. | I-1 | I-2 | I-3 | I-4 | I-5 | I-6 | I-7 |
|---|---|---|---|---|---|---|---|
| $TiCl_3$, g. | 0.89 | 1.00 | 0.81 | 0.94 | 1.07 | 1.00 | 1.05 |
| Iso-$Bu_3Al$, ml. | 2.27 | 2.55 | 2.05 | 2.40 | 2.70 | 2.55 | 2.65 |
| Heptane, ml. | 269 | 550 | 643 | 582 | 521 | 700 | 1090 |
| Styrene, ml. | 445 | 490 | 385 | 423 | 482 | 400 | 267 |
| 1-octene, ml. | 0 | 10 | 20 | 47 | 53 | 100 | 157 |
| Yield, percent | 29.0 | 38.2 | 42.6 | 43.1 | 47.4 | 47.7 | 42.7 |
| Intrinsic viscosity, [a] $[\eta]_0$ | 4.15 | 6.90 | 8.12 | 7.93 | 6.74 | 6.45 | 4.61 |
| Octene in copolymer, mole percent [b] | 0 | 2.1 | 3.3 | 5.7 | 9.0 | 15 | 31 |
| Crystallinity, percent [c] | 25 | 19.2 | 25.1 | 18.3 | 12.9 | 17.7 | 10.9 |

[a] Intrinsic viscosity measured in chlorobenzene at 30° C.
[b] Copolymer analysis by nuclear magnetic resonance.
[c] Crystallinity determined by differential scanning calorimetry.

It can be seen from the Table I that copolymers containing from 2.1 to 31 mole percent of 1-octene have been prepared by varying the amounts of monomers, catalyst, and solvent used. The crystallinities of the resulting copolymers may be increased by annealing the samples.

Example II

To illustrate the increased rate of molecular weight degradation of the styrene/1-octene copolymers over the rate of degradation of the polystyrene, the polymer and copolymers prepared in Example I were heated in the presence of air at the temperatures shown and for the times indicated in Table II. The degradation in molecular weight, and the drop in intrinsic viscosity of the samples, is shown in the Table II and the initial rate of degradation is shown graphically in FIG. I of the drawings.

TABLE II

Degradation of Styrene/1-Octene Copolymers

| Sample No. | Mole percent 1-octene | Initial molecular weight [a] | | Molecular weight [b] after degradation | | | | $[\eta]/[\eta]_0$ |
|---|---|---|---|---|---|---|---|---|
| | | $[\eta]_0$ | Mv | Hours | Temp., °C. | $[\eta]$ | Mv | |
| I-1 | 0 | 4.15 | 1,900,000 | 6 | 150 | 5.00 | 2,400,000 | 1.21 |
| | | | | 24 | 150 | 4.42 | 2,100,000 | 1.06 |
| I-2 | 2.1 | 6.90 | 3,800,000 | 6 | 150 | 4.83 | 2,300,000 | 0.70 |
| | | | | 24 | 150 | 3.18 | 1,300,000 | 0.46 |
| | | | | 6 | 180 | 2.41 | 900,000 | 0.35 |
| | | | | 24 | 180 | 0.51 | 105,000 | 0.074 |
| I-3 | 3.3 | 8.12 | 4,700,000 | 6 | 150 | 5.19 | 2,600,000 | 0.64 |
| | | | | 24 | 150 | 2.55 | 980,000 | 0.31 |
| | | | | 6 | 180 | 2.26 | 820,000 | 0.23 |
| | | | | 24 | 180 | 0.495 | 100,000 | 0.061 |
| I-4 | 5.7 | 7.93 | 4,500,000 | 6 | 150 | 3.72 | 1,650,000 | 0.47 |
| | | | | 24 | 150 | 1.05 | 290,000 | 0.13 |
| I-5 | 9.0 | 6.74 | 3,600,000 | 2 | 150 | 4.75 | 2,250,000 | 0.71 |
| | | | | 4 | 150 | 2.46 | 920,000 | 0.37 |
| | | | | 6 | 150 | 1.28 | 380,000 | 0.19 |
| I-6 | 15.0 | 6.45 | 3,400,000 | 2 | 150 | 1.63 | 530,000 | 0.25 |
| I-7 | 31.0 | 4.61 | 2,200,000 | 2 | 150 | 0.46 | 91,000 | 0.10 |

[a] $[\eta]_0$ = Initial intrinsic viscosity measured in chlorobenzene at 30° C. Mv = viscosity average molecular weight calculated from $[\eta]_0$.
[b] $[\eta]$ = Intrinsic viscosity after degradation measured in chlorobenzene at 30° C. Mv = viscosity average molecular weight calculated from $[\eta]$.

Referring to FIG. I of the drawings, the viscosity of the copolymer after degradation has been divided by the initial viscosity in order to normalize all the curves to a single starting point. It may be seen from the figure that the initial rate of degradation in molecular weight increases as the mole percent of 1-octene in the copolymer increases. The increase in viscosity of the polystyrene sample I-1 is probably due to a small amount of crosslinking which occurs prior to degradation. The sample then starts to degrade as indicated by the 24 hour heating.

Example III

To illustrate the general applicability of the use of alpha-olefins as an aid to more rapid degradation of molecular weight of crystalline polystyrene, a series of copolymers was made by the general method outlined in Example I. The mole percent comonomer in the copolymers and the initial intrinsic viscosity of the copolymers is recorded in Table III. Each copolymer was subjected to heat in the presence of air from 1 to 24 hours and the resulting intrinsic viscosity measured. The results are also tabulated in Table III. Molecular weights are included for convenience.

TABLE III

Degradation of Styrene/α-Olefin Copolymers

| Sample No. | Comonomer, mole and in copolymer | Initial molecular weight a | | Molecular weight b after degradation | | | | |
|---|---|---|---|---|---|---|---|---|
| | | $[\eta]_0$ | Mv | Hours | Temp., °C. | $[\eta]$ | Mv | $[\eta]/[\eta]_0$ |
| III-1 | None, 0 | 4.15 | 1,900,000 | 6 | 150 | 5.0 | 2,400,000 | 1.21 |
| | | | | 24 | 150 | 4.42 | 2,100,000 | 1.06 |
| III-2 | Propylene, 5.0 | 4.37 | 2,000,000 | 6 | 150 | 2.87 | 1,150,000 | 0.66 |
| | | | | 24 | 150 | 0.79 | 190,000 | 0.18 |
| | | | | 6 | 200 | 0.18 | 24,000 | 0.041 |
| | | | | 24 | 200 | 0.08 | 7,800 | 0.018 |
| III-3 | 3-methyl-1-butene, 20 | 8.65 | 5,200,000 | 6 | 150 | 6.19 | 3,250,000 | 0.72 |
| | | | | 24 | 150 | 3.64 | 1,600,000 | 0.42 |
| | | | | 6 | 200 | 0.28 | 45,000 | 0.032 |
| | | | | 24 | 200 | 0.16 | 20,500 | 0.018 |
| III-4 | 1-pentene, 16.0 | 8.59 | 5,000,000 | 4 | 150 | 2.21 | 800,000 | 0.26 |
| | | | | 6 | 150 | 1.87 | 640,000 | 0.22 |
| III-5 | 1-pentene, 20.0 | 7.40 | 4,200,000 | 2 | 150 | 4.50 | 2,100,000 | 0.61 |
| | | | | 6 | 150 | 3.52 | 1,500,000 | 0.48 |
| III-6 | 1-pentene, 35.0 | 6.82 | 3,700,000 | 1 | 150 | 4.39 | 2,000,000 | 0.64 |
| | | | | 3 | 150 | 0.77 | 190,000 | 0.11 |
| III-7 | 1-hexene, 7.0 | 5.1 | 2,500,000 | 6 | 150 | 4.25 | 1,950,000 | 0.83 |
| | | | | 24 | 150 | 3.94 | 1,750,000 | 0.77 |
| | | | | 6 | 180 | 0.61 | 135,000 | 0.12 |
| | | | | 24 | 180 | 0.25 | 38,500 | 0.049 |
| III-8 | 1-hexene, 12.0 | 4.78 | 2,300,000 | 6 | 150 | 1.85 | 620,000 | 0.39 |
| | | | | 24 | 150 | 0.92 | 240,000 | 0.19 |
| III-9 | 1-hexene, 22.0 | 5.59 | 2,800,000 | 6 | 150 | 0.77 | 190,000 | 0.14 |
| | | | | 24 | 150 | 0.36 | 65,000 | 0.064 |
| III-10 | 1-decene, 6.0 | 7.47 | 4,200,000 | 4 | 150 | 4.99 | 2,400,000 | 0.67 | a $[\eta]_0$=Initial intrinsic viscosity determined in chlorobenzene at 30° C. Mv=viscosity average molecular weight calculated from $[\eta]_0$.
b $[\eta]$=Intrinsic viscosity after degradation measured in chlorobenzene at 30° C. Mv=viscosity average molecular weight calculated from $[\eta]$.

Figure 2:
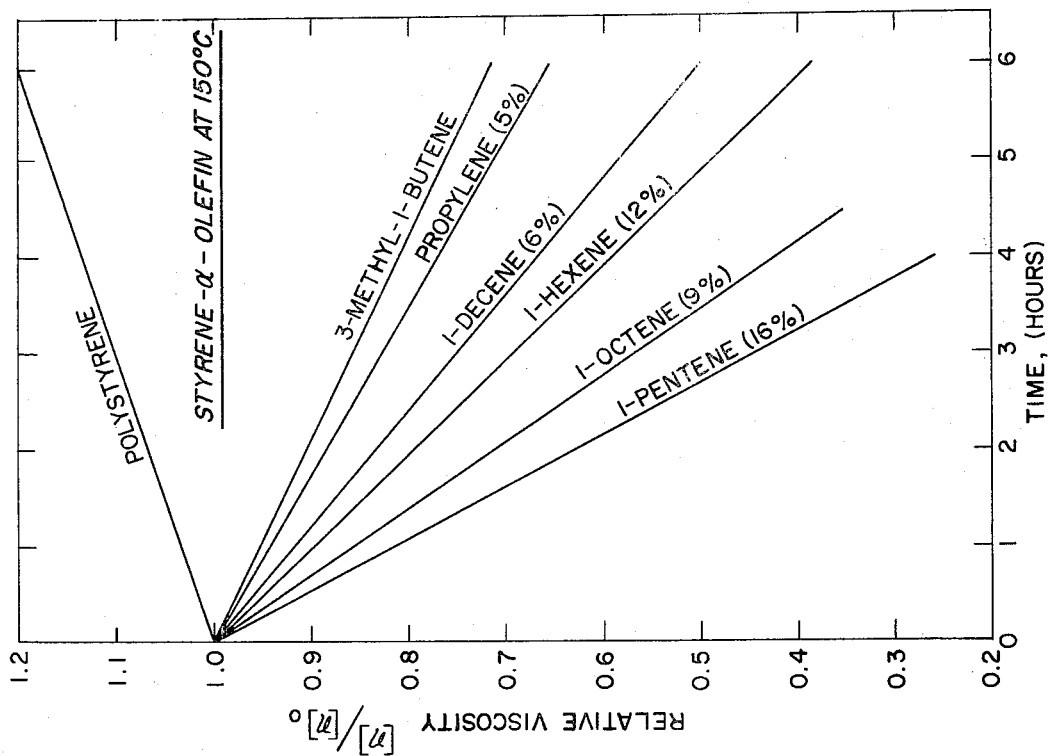
FIG. 2 is a graph showing the relative reduction in viscosity versus time of heating at 150° C. of copolymers of styrene containing various alpha-olefins.

From the table it is apparent that the use of 180° C. or 200° C. rather than 150° C. for the degradation greatly increases the rate of molecular weight decrease. FIG. 2 of the drawings is a normalized plot of relative initial rates of degradation at 150° C. There is no apparent correlation between number of carbons of the alpha-olefin and the rate of degradation of molecular weight.

What is claimed is:

1. A process for preparing a highly crystalline, isotactic polystyrene product having a molecular weight of less than 1,000,000 comprising:
    (a) preparing a highly crystalline, isotactic copolymer having a molecular weight of greater than 1,000,000 and consisting of styrene and from 2 to 20 percent by weight of an alpha-olefin having from 3 to 10 carbon atoms; and
    (b) lowering the molecular weight of said copolymers by heating it in air at a temperature of between 100° C. and 260° C. until the desired molecular weight has been obtained, whereby the rate of degradation is increased over the rate of degradation of crystalline polystyrene while the degree of crystallinity of the resulting product is increased over that of said copolymer.

2. The process of claim 1 wherein said alpha-olefin is selected from the group consisting of propylene, 1-butene, 1-pentene, 3-methyl-1-butene, 1-hexene, 1-octene, and 1-decene.

3. The process of claim 1 wherein said heating is carried out at a temperature of between 140° C. and 200° C.

4. The process of claim 1 wherein said lowering of the molecular weight of said copolymer comprises heating by milling in air at a temperature of between 100° C. and 260° C.

References Cited

UNITED STATES PATENTS 3,157,624  11/1964  De Vries _____ 260—88.2
3,414,553  12/1968  Kern _____ 260—93.5

JAMES A. SEIDLECK, Primary Examiner

R. S. BENJAMIN, Assistant Examiner

U.S. Cl. X.R.

260—88.2 S